United States Patent
Kim et al.

(10) Patent No.: US 10,547,947 B2
(45) Date of Patent: Jan. 28, 2020

(54) DEVICE FOR GENERATING AUDIO OUTPUT

(71) Applicant: QUALCOMM Incorporated, San Diego, CA (US)

(72) Inventors: Lae-Hoon Kim, San Diego, CA (US); Hyun Jin Park, San Diego, CA (US); Erik Visser, San Diego, CA (US); Raghuveer Peri, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 68 days.

(21) Appl. No.: 15/158,505

(22) Filed: May 18, 2016

(65) Prior Publication Data

US 2017/0339491 A1   Nov. 23, 2017

(51) Int. Cl.

| | |
|---|---|
| *H04R 3/12* | (2006.01) |
| *H04R 5/02* | (2006.01) |
| *H04S 7/00* | (2006.01) |
| *H03G 5/16* | (2006.01) |
| *H03G 3/30* | (2006.01) |
| *H03G 3/02* | (2006.01) |
| *H04R 5/04* | (2006.01) |
| *H04R 5/033* | (2006.01) |

(Continued)

(52) U.S. Cl.
CPC .............. *H04R 5/04* (2013.01); *G06F 3/165* (2013.01); *H04R 5/033* (2013.01); *H04R 29/001* (2013.01); *H04R 2430/03* (2013.01); *H04R 2460/01* (2013.01)

(58) Field of Classification Search
CPC ........ H04R 5/04; H04R 5/033; H04R 29/001; H04R 2460/01; H04R 2430/03; H04R 2460/05; H04R 1/1083; H04R 1/1008; H04R 3/005; H04R 1/1041; G06F 3/165; H04M 1/6058; H04M 1/6016; H04M 1/6008

See application file for complete search history.

(56) References Cited

U.S. PATENT DOCUMENTS

| | | |
|---|---|---|
| 5,815,582 A | 9/1998 | Claybaugh et al. |
| 8,189,803 B2 | 5/2012 | Bergeron et al. |
| 8,416,959 B2 | 4/2013 | Lott et al. |

(Continued)

OTHER PUBLICATIONS

"Parrot Zik 2.0 Headphones Application User Guide", Nov. 7, 2014, Parrot SA, Paris, France, 13 pages.

(Continued)

*Primary Examiner* — Ping Lee
(74) *Attorney, Agent, or Firm* — Moore IP

(57) ABSTRACT

A headset device includes a first earpiece configured to receive a reference sound and to generate a first reference audio signal based on the reference sound. The headset device further includes a second earpiece configured to receive the reference sound and to generate a second reference audio signal based on the reference sound. The headset device further includes a controller coupled to the first earpiece and to the second earpiece. The controller is configured to generate a first signal and a second signal based on a phase relationship between the first reference audio signal and the second reference audio signal. The controller is further configured to output the first signal to the first earpiece and output the second signal to the second earpiece.

30 Claims, 6 Drawing Sheets

(51) Int. Cl.
*G06F 3/16* (2006.01)
*H04R 29/00* (2006.01)

(56) References Cited

U.S. PATENT DOCUMENTS

| | | | |
|---|---|---|---|
| 8,477,955 B2 | 7/2013 | Engle et al. | |
| 9,881,619 B2 | 1/2018 | Visser et al. | |
| 2010/0014685 A1* | 1/2010 | Wurm | G10K 11/178 381/71.11 |
| 2011/0038496 A1* | 2/2011 | Lott | H04R 5/033 381/309 |
| 2012/0020485 A1 | 1/2012 | Visser et al. | |
| 2012/0063611 A1* | 3/2012 | Kimura | H04R 1/1083 381/71.6 |
| 2012/0215519 A1 | 8/2012 | Park et al. | |
| 2013/0156214 A1 | 6/2013 | Murthy et al. | |
| 2013/0301837 A1* | 11/2013 | Kim | H04N 7/15 381/56 |
| 2014/0126733 A1 | 5/2014 | Gauger, Jr. et al. | |
| 2014/0311499 A1 | 10/2014 | Lee et al. | |
| 2015/0172814 A1 | 6/2015 | Usher et al. | |
| 2018/0020312 A1 | 1/2018 | Visser et al. | |

OTHER PUBLICATIONS

"Parrot Zik 3 Headphones Application User Guide", Nov. 26, 2015, Parrot SA, Paris, France, 20 pages.
"Parrot Zik Headphones Application quick start Guide", Jul. 27, 2012, Parrot SA, Paris, France, 112 pages.
Shanklin, W, "Here Active Listening Earbuds: Augmented Reality for Your Ears (hands-on)", GIZMAG, Wearable Electronics, Jan. 13, 2016, GIZMAG, Victoria, Austailia, 4 Pages.
"HoloLens Official Site," Retrieved from <<https://www.microsoft.com/microsoft-hololens/en-us>>, retrieved on May 17, 2016, Microsoft Corporation, Redmond, Washington, 8 pages.
International Search Report and Written Opinion—PCT/US2017/025051—ISA/EPO—dated Sep. 15, 2017.
Partial International Search Report—PCT/US2017/025051—ISA/EPO—dated Jun. 23, 2017.

* cited by examiner

DEVICE FOR GENERATING AUDIO OUTPUT

I. FIELD

The present disclosure is generally related to devices that generate audio output.

II. DESCRIPTION OF RELATED ART

Advances in technology have resulted in smaller and more powerful computing devices. For example, a variety of portable personal computing devices, including wireless telephones, such as mobile and smart phones, tablets and laptop computers are small, lightweight, and easily carried by users. These devices can communicate voice and data packets over wireless networks. Further, many such devices incorporate additional functionality, such as a digital still camera, a digital video camera, a digital recorder, and an audio file player. Also, such devices can process executable instructions, including software applications, such as a web browser application, that can be used to access the Internet. As such, these devices can include significant computing and networking capabilities.

Some computing devices are incorporated into virtual reality systems. Such a system may present virtual (e.g., computer generated) sensory information (e.g., visual information, audio information, etc.) to a user. For example, a virtual reality system may include a display device that displays virtual (e.g., computer generated) objects along with real world objects to a user. Accordingly, the user may perceive the virtual objects alongside the real world objects. In addition or in the alternative, virtual reality systems may include an audio output device that presents virtual (e.g., computer generated) sounds to the user. For example, a virtual sound may correspond to a virtual object. To illustrate, a virtual sound may correspond to computer generated speech associated with a virtual character. However, open-type audio systems (e.g., audio systems that do not cover an individual's ear completely) may broadcast sound to individuals other than the user. Further, closed-type audio systems (e.g., audio systems that cover the individual's ear completely) may occlude or partially occlude a user's ear. The occlusion of the user's ear caused by the closed-type audio system may distort sounds travelling to the user's ear from the real world environment.

III. SUMMARY

In a particular aspect, a headset device includes a first earpiece configured to receive a reference sound and to generate a first reference audio signal based on the reference sound. The headset device further includes a second earpiece configured to receive the reference sound and to generate a second reference audio signal based on the reference sound. The headset device further includes a controller coupled to the first earpiece and to the second earpiece. The controller is configured to generate a first signal and a second signal based on a phase relationship between the first reference audio signal and the second reference audio signal. The controller is further configured to output the first signal to the first earpiece and output the second signal to the second earpiece.

In a particular aspect, a headset device includes a first earpiece. The first earpiece includes a first reference microphone configured to generate a first reference audio signal based on a reference sound from a source external to the first earpiece. The first earpiece further includes a first speaker and a first feedback microphone configured to generate a first feedback audio signal based on an output of the first speaker. The headset device further includes a second earpiece and an adaptive filter. The adaptive filter is configured to provide a filtered audio signal to the first speaker, the filtered audio signal based on the first reference audio signal and the first feedback audio signal and based on an indication of sound detected at the second earpiece.

In a particular aspect, a headset device includes a first earpiece. The first earpiece includes a first reference microphone configured to generate a first reference audio signal based on a reference sound from a source external to the first earpiece. The first earpiece further includes a first user-customized filter configured to generate a first customized audio signal based on the first reference audio signal. The first earpiece further includes a first speaker and a first feedback microphone. The first feedback microphone is configured to generate a first feedback audio signal based on an output of the first speaker. The headset device further includes an adaptive filter configured to filter the first customized audio signal to provide a filtered audio signal to the first speaker. The filtered audio signal filtered is based on the first feedback audio signal and based on an indication of sound detected at a second earpiece.

In a particular aspect, a headset device includes means for generating a first audio output. The means for generating the first audio output is configured to generate a first reference audio signal based on a reference sound. The headset device further includes means for generating a second audio output. The means for generating the second audio output is configured to generate a second reference audio signal based on the reference sound. The headset device further includes means for generating a first signal and a second signal based on a phase relationship between the first reference audio signal and the second reference audio signal. The means for generating the first signal and the second signal is configured to output the first signal to the means for generating the first audio output and output the second signal to the means for generating the second audio output.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Particular aspects of the present disclosure are described below with reference to the drawings. In the description, common features are designated by common reference numbers throughout the drawings. As used herein, various terminology is used for the purpose of describing particular implementations only and is not intended to be limiting. For example, the singular forms "a," "an," and "the" are intended to include the plural forms as well, unless the context clearly indicates otherwise. It may be further understood that the terms "comprises" and "comprising" may be used interchangeably with "includes" or "including." Additionally, it will be understood that the term "wherein" may be used interchangeably with "where." As used herein, "exemplary" may indicate an example, an implementation, or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

A device for outputting audio is disclosed. The device may be included in a closed-type audio system. The device may reproduce sounds from a sound source outside the closed-type audio system to compensate for distortion of the sounds due to occlusion of an individual's ear caused by the closed-type audio system. The device may reproduce the sounds in such a way as to indicate the direction of the sound source to the individual.

Figure 1:
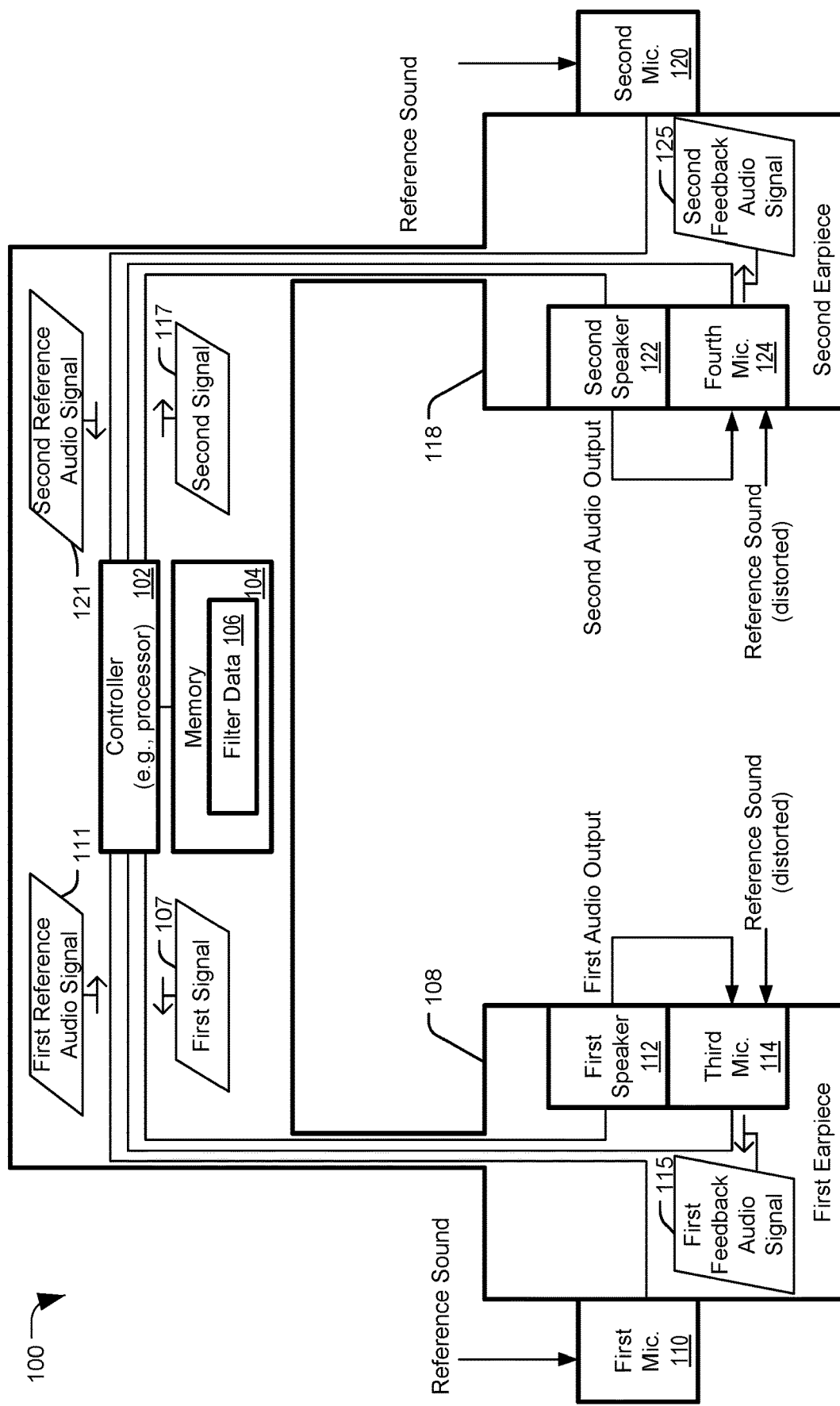
FIG. 1 is a diagram of an illustrative example of a headset device.

Referring to FIG. 1, an illustrative implementation of a headset device is shown and generally designated 100. The headset device 100 is configured to generate audio output. For example, the headset device 100 may be configured to reproduce a reference sound originating from outside the headset device 100. The headset device 100 may reproduce the reference sound in a way that preserves an indication of a direction of origin of the reference sound (e.g., a phase difference between the sound as detected at a right ear of a user and the sound as detected at a left ear of the user, loudness of the sound as detected by a right ear of the user and as detected by the left ear of the user, etc.).

The headset device 100 includes a first earpiece 108 and a second earpiece 118. The headset device 100 may correspond to closed type headset. Accordingly, the earpieces 108, 118 may correspond to over the ear earpieces configured to cover a user's ears or to earbuds configured to cover the user's ear canal. The first earpiece 108 may include a first microphone 110 (e.g., a reference microphone) and a first speaker 112. The second earpiece 118 may include a second microphone 120 (e.g., a reference microphone) and a second speaker 122.

The first speaker 112 and the second speaker 122 may be positioned to output audio to the user's ear when the headset device 100 is worn by the user. The first microphone 110 and the second microphone 120 may be positioned to capture sounds that reach the outside of the earpieces 108, 118. Since the earpieces 108, 118 are configured to cover the ears of the user, the microphones 110, 120 may receive a sounds as the sound would ordinarily be received by the ears of the user in the absence of the headset device 100.

The first earpiece 108 may further include a third microphone 114 (e.g., a feedback microphone). The third microphone 114 may be positioned so that the third microphone 114 receives (e.g., detects) sounds that reach the first ear while the user is wearing the headset device 100. To illustrate, the third microphone 114 may be positioned inside an earphone (e.g., with the first speaker 112) or on a portion of an earbud configured to be inserted into a human ear (e.g., with the first speaker 112). The third microphone 114 may receive sounds that originate outside the headset device 100 as distorted by the first earpiece 108 covering the first ear. In addition, the third microphone 114 may receive sound output by the first speaker 112.

The second earpiece 118 may further include a fourth microphone 124 (e.g., a feedback microphone). The fourth microphone 124 may be positioned so that the fourth microphone 124 receives (e.g., detects) sounds that reach the second ear while the user is wearing the headset device 100. To illustrate, the fourth microphone 124 may be positioned inside an earphone (e.g., with the second speaker 122) or on a portion of an earbud configured to be inserted into a human ear (e.g., with the second speaker 122). The fourth microphone 124 may receive sounds that originate outside the headset device 100 as distorted by the second earpiece 118 covering the second ear. In addition, the fourth microphone 124 may receive sound output by the second speaker 122.

The headset device 100 further includes a controller 102 and a memory 104. The controller 102 may correspond to a processor (e.g., a central processor unit, a digital signal processor, etc.). As explained further below with reference to FIG. 6, the controller 102 may be included in a different device that is in communication with the headset device 100 in some examples. The memory 104 may include random access memory, static random access memory, a solid state drive, a hard disc drive, or any other type of memory device. The memory 104 may store filter data 106 (e.g., one or more filter coefficients). In particular examples, the filter data 106 may correspond to a single filter or to a plurality of filters (e.g., each of the earpieces 108, 118 may have a different corresponding filter). In particular examples, the first earpiece 108 and the second earpiece 118 may each have a distinct corresponding controller. In addition, or in the alternative, the first earpiece 108 and the second earpiece 118 may each have a distinct corresponding memory device. The one or more filters may include hardware filters, software filters, or a combination thereof.

In operation, the first microphone 110 receives a reference sound from a sound source. For example, the reference sound may correspond to a test tone or other sound output by a speaker as part of a calibration process for the headset device 100. Alternatively, the reference sound may correspond to any other sound originating from a source other than the speakers 112, 122. For example, the reference sound may correspond to a human talking, to a dog barking, to a car horn, or to any other sound. The first microphone 110 generates a first reference audio signal 111 based on the reference sound as detected by the first microphone 110.

The second microphone 120 may also receive the reference sound from the sound source. However, properties of the reference sound as received at the first microphone 110 and as received at the second microphone 120 may be different. For example, due to an orientation of the headset device 100 relative to the sound source, the reference sound as detected at the first microphone 110 may have a different amplitude (e.g., be louder, or quieter) than the reference sound as detected at the second microphone 120. As another example, a first phase of the reference sound as detected at the first microphone 110 may be different than a second phase of the reference sound as detected at the second microphone 120. The second microphone 120 generates a second reference audio signal 121 based on the reference sound as detected by the second microphone 120. The first reference audio signal 111 and the second reference audio signal 121 may have different properties due to positioning of the first microphone 110 and the second microphone 120 relative to the sound source. To illustrate, the first reference audio signal 111 may have a different phase than the second reference audio signal 121, a different amplitude (e.g., indicating volume) than the second reference audio signal 121, or a combination thereof.

Human beings may utilize properties of sound to determine a location of a sound source. To illustrate, a difference in volume of a sound as detected by a person's left ear and the sound as detected by the person's right ear may indicate which ear is closer to the sound. Further, the person may be able to determine a specific direction the sound originated from based on a magnitude of the difference. Similarly, a phase difference (e.g., caused by the sound reaching one ear before the other) between the sound as detected by the left ear and the sound as detected by the right ear may indicate the direction.

The controller 102 may generate a first signal 107 based on the first reference audio signal 111 and a second signal 117 based on the second reference audio signal 121. The controller 102 may correspond to different controllers associated with each of the earpieces 108, 118 and each of the first signal 107 and the second signal 117 may be generated by a different one of the controllers.

In particular implementations, the controller 102 may generate the first signal 107 and the second signal 117 using the filter data 106. For example, the controller 102 may apply the filter data 106 to the first reference audio signal 111 to generate the first signal 107. Thus, the first signal 107 may correspond to a filtered version of the reference sound. Similarly, the controller 102 may apply the filter data 106 to the second reference audio signal 121 to generate the second signal 117. Thus, the second signal 117 may correspond to a filtered version of the reference sound. In particular examples, the filter data 106 corresponds to more than one filter. To illustrate, a first filter may be used to generate the first signal 107, and a second filter may be used to generate the second signal 117. The first speaker 112 may generate first audio output based on the first signal 107, and the second speaker 122 may generate second audio output based on the second signal 117.

The filter data 106 may be configured to reduce sound interference experienced by a user of the headset device 100. For example, the reference sound may penetrate the first earpiece 108 so that the user's left ear may detect a first distorted (e.g., by the body of the first earpiece 108) version of the reference sound as well as the first audio output. The filter data 106 may be configured to reduce an effect of the first distorted version of the reference sound, as explained further below. To illustrate, the filter data 106 may be configured to generate the first signal 107 so that a sum of the first audio output and the first distorted version of the reference sound approximates the reference sound. Similarly, the reference sound may penetrate the second earpiece 118 so that the user's right ear may detect a second distorted (e.g., by the body of the second earpiece 118) version of the reference sound as well as the second audio output. The filter data 106 may be configured to reduce an effect of the second distorted version of the reference sound, as explained further below. To illustrate, the filter data 106 may be configured to generate the second signal 117 so that a sum of the second audio output and the second distorted version of the reference sound approximates the reference sound.

The third microphone 114 may receive the first audio output from the first speaker 112. In addition, the third microphone 114 may receive the first distorted version of the reference sound through the body of the first earpiece 108. The third microphone 114 may generate a first feedback audio signal 115 based on the first audio output and the first distorted version of the reference sound. Similarly, the fourth microphone 124 may receive the second audio output from the second speaker 122 and the second distorted version of the reference sound through the body of the second earpiece 118. The fourth microphone 124 may generate a second feedback audio signal 125 based on the second audio output and the second distorted version of the reference sound. The controller 102 may adjust the filter data 106 based on the first feedback audio signal 115 and the second feedback audio signal 125 to compensate (e.g., filter out) effects of the distorted versions of the reference sounds on the first and second outputs.

The controller 102 may generate the first signal 107 and the second signal 117 based on a phase relationship (or other direction indicating relationship) between the first reference audio signal (e.g., the reference sound as detected at the first microphone 110) and the second reference audio signal 121 (e.g., the reference sound as detected at the second microphone 120). To illustrate, the controller 102 may generate the first signal 107 and the second signal 117 so that a first phase difference between the first reference audio signal 111 and the second reference audio signal 121 is substantially equal to a second phase difference between the first feedback audio signal 115 and the second feedback audio signal 125. For example, the controller 102 may constrain one or more filters corresponding to the filter data 106 when generating the first signal 107 and the second signal 117 so that the first phase difference is substantially equal to the second phase difference, as explained further below. Since the first feedback audio signal 115 corresponds to sound presented to a first ear of the user (e.g., a left ear or a right ear) and the second feedback audio signal 125 corresponds to sound presented to a second ear of the user, the user may be able to determine a location of the sound source of the reference sound.

In addition or in the alternative, the controller 102 may generate the first signal 107 and the second signal 117 based on an amplitude relationship between the first reference audio signal 111 and the second reference audio signal 121. To illustrate, the controller 102 may generate the first signal 107 and the second signal 117 so that a first ratio of a first amplitude of the first reference audio signal 111 to a second amplitude of the second reference audio signal 121 is substantially equal to a second ratio of a third amplitude of the first feedback audio signal 115 to a fourth amplitude of the second feedback audio signal 125. For example, the controller 102 may constrain one or more filters corresponding to the filter data 106 when generating the first signal 107 and the second signal 117 so that the first ratio is substantially equal to the second ratio, as explained further below. Since the first feedback audio signal 115 corresponds to sound presented to a first ear of the user (e.g., a left ear or a right ear) and the second feedback audio signal 125 corresponds to sound presented to a second ear of the user, the user may be able to determine a location of the sound source of the reference sound.

Therefore, the headset device 100 may enable pass through of a sound (e.g., the reference sound) originating from a source outside of the headset device 100. Further, the headset device 100 may determine one or more sound properties (e.g., amplitude, phase, etc.) of the sound as detected outside of each earpiece of the headset device 100. The headset device 100 may preserve one or more relationships between sound properties as detected at each of the earpieces and maintain the relationship(s) to generate pass through sound. Accordingly, the user may be able to determine a location of the source based on the pass through sound.

In an illustrative use case, a user of the headset device 100 may be located in a noisy environment, such as a coffee shop. In such an example, the reference sound illustrated in FIG. 1 may correspond to a sound generated within the coffee shop. For example, the reference sound may correspond to a voice of a barista asking the user for his or her order. Since the reference sound is passed through to the user as the first audio output and the second audio output, the user may be able to hear the barista even while wearing the headset device 100. Further, since the first audio output and the second audio output may have one or more location indicating relationships (e.g., phase difference, amplitude ratios) that are based on the reference sound as detected at each of the earpieces 108, 118. Accordingly, the user may be able to locate the barista based on the first audio output and the second audio output even if, for example, the user's back is turned to the barista.

Figure 2:
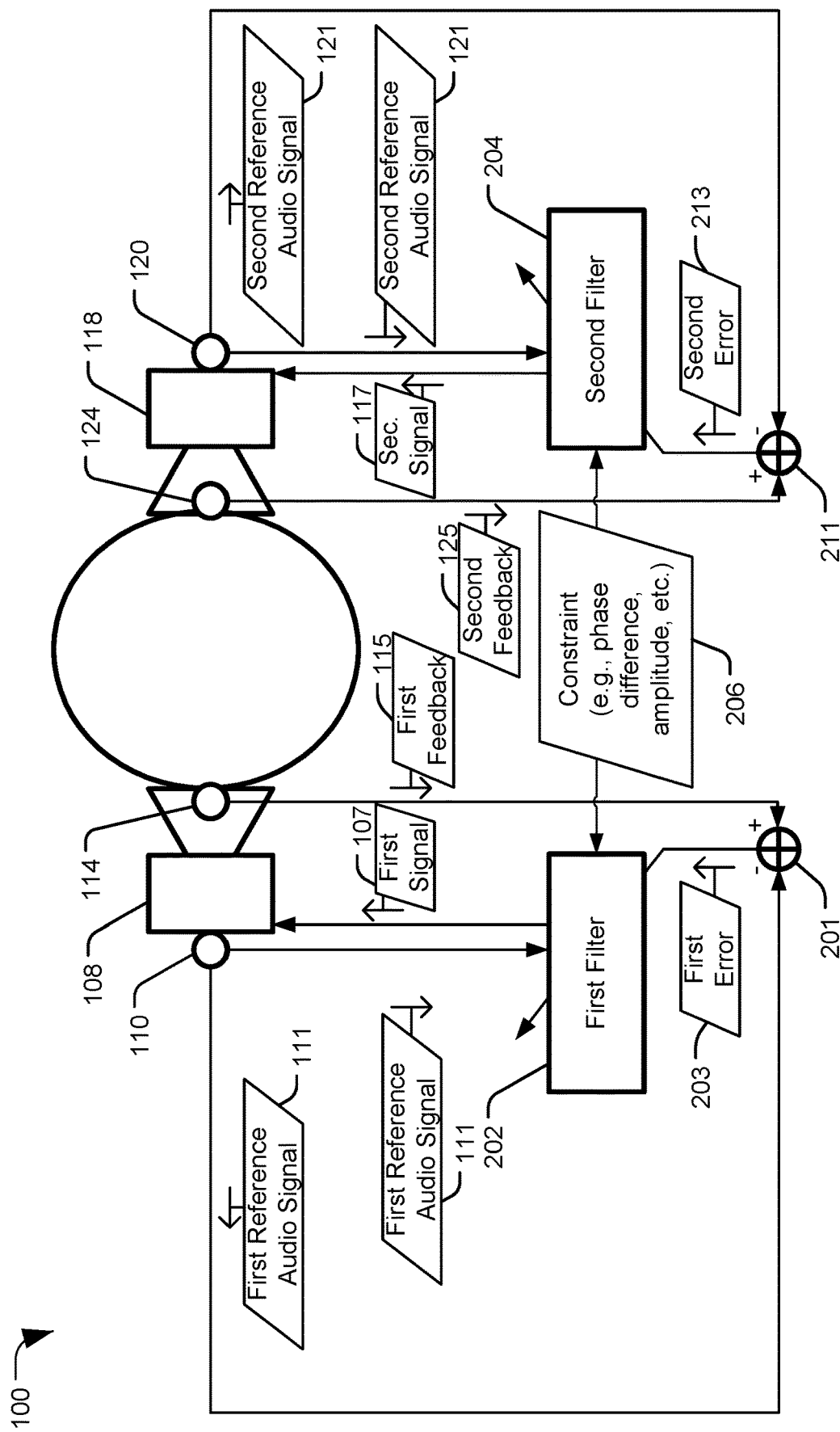
FIG. 2 is a diagram of another illustrative example of a headset device.

Referring to FIG. 2, another example of the headset device 100 is shown. As illustrated in FIG. 2, the headset device 100 includes the first earpiece 108, the second earpiece 118, the first microphone 110, the second microphone 120, the third microphone 114, and the fourth microphone 124. While not shown, the headset device 100 of FIG. 2 may include the first speaker 112, the second speaker 122, the controller 102, and the memory 104.

In the example of FIG. 2, the headset device 100 includes a first filter 202 and a second filter 204. Thus, FIG. 2 illustrates an example of the filter data 106 corresponding to two different filters. The first filter 202 may include hardware or software. Similarly, the second filter 204 may include hardware or software. In some embodiments, the first filter 202 and the second filter 204 may correspond to the same hardware or software. The first filter 202 and the second filter 204 may operate differently based on different data (e.g., filter coefficients, such as the filter data 106) being applied to the common hardware or software. The first filter 202 may correspond to the first earpiece 108, and the second filter 204 may correspond to the second earpiece 118. The headset device 100 as illustrated in FIG. 2 further includes a first mixer 201 and a second mixer 211.

The first filter 202 and the second filter 204 may operate on one or more sub-bands of a sound spectrum (e.g., corresponding to the range of sound frequencies audible to humans). The first filter 202 and 204 may operate separately on multiple different sub-bands within the sound spectrum. The first feedback audio signal 115 may correspond to sound as presented to a first ear of the user of the headset device 100. The first feedback audio signal 115 may be described by the equation $y_1(k, t) = H1_{adapt}(k)x_1(k, t-t_d) + H1_{occlusion}(k)x_1(k, t-t_d)$, where k corresponds to a sub-band of the sound spectrum, $t-t_d$ corresponds to a period of time, $x_1(k, t-t_d)$ is a function describing sound (e.g., the reference sound) in the sub-band detected by the first microphone 110 over the period of time, $H1_{adapt}(k)$ is a function corresponding to the first filter 202, and $H1_{occlusion}(k)$ is a function describing a distortion effect in the sub-band (e.g., to the reference sound) caused by the body of the first earpiece 108. The second feedback audio signal 125 may correspond to sound as presented to a second ear of the user of the headset device 100. The second feedback audio signal 125 may be described by the equation $y_2(k, t) = H2_{adapt}(k)x_2(k, t-t_d) + H2_{occlusion}(k)x_2(k, t-t_d)$, where k corresponds to the sub-band of the sound spectrum, $t-t_d$ corresponds to the period of time, $x_2(k, t-t_d)$ is a function describing sound (e.g., the reference sound) in the sub-band detected by the second microphone over the period of time, $H2_{adapt}(k)$ is a function corresponding to the second filter 204, and $H2_{occlusion}(k)$ is a function describing a distortion effect (e.g., to the reference sound) in the sub-band caused by the body of the second earpiece 118. The first signal 107 may be described by the expression $H1_{adapt}(k)x_1(k, t-t_d)$, and the second signal 117 may be described by the expression $H2_{adapt}(k)x_2(k, t-t_d)$.

In order to reduce effects of $H1_{occlusion}(k)x_1(k, t-t_d)$ and $H2_{occlusion}(k)x_2(k, t-t_d)$ on sound presented to the first ear and the second ear, the controller 102 may configure the filters 202, 204 according to the function $$\underset{H1_{adapt}(k),\ H2_{adapt}(k)}{\operatorname{argmin}} \|y_1(k, t) - x_1(k, t - t_d)\|^2 + \|y_2(k, t) - x_2(k, t - t_d)\|^2.$$

Thus, the controller 102 may configure the first filter 202 (e.g., $H1_{adapt}(k)$) and the second filter 204 (e.g., $H2_{adapt}(k)$) to reduce a difference between sound detected by the third microphone 114 (e.g., $y_1(k, t)$) and sound detected by the first microphone 110 (e.g., $x_1(k, t-t_d)$) and a difference between sound detected by the fourth microphone 124 (e.g., $y_2(k, t)$) and sound detected by the second microphone 120 (e.g., $x_2(k, t-t_d)$). Accordingly, the headset device 100 may pass through a sound detected outside the headset device 100 and the filters 202, 204 may reduce effects of distorted versions of the sound on a perception of a user.

In an illustrative example, the first mixer 201 may generate a first error signal 203 based on a difference between feedback from the third microphone 114 (e.g., the first feedback audio signal 115) and the first reference audio signal 111. The first error signal 203 may be represented by the expression $y_1(k, t) - x_1(k, t-t_d)$ or or $\|y_1(k, t) - x_1(k, t-t_d)\|^2$. The controller may set the first filter 202 to reduce or minimize $\|y_1(k, t) - x_1(k, t-t_d)\|^2$. The second mixer 211 may generate a second error signal 213 based on a difference between feedback from the fourth microphone 124 (e.g., the second feedback audio signal 125) and the second reference audio signal 121. The second error signal 213 may be represented by the expression $y_2(k, t) - x_2(k, t-t_d)$ or $\|y_2(k, t) - x_2(k, t-t_d)\|^2$. The controller may set the second filter 204 to reduce or minimize $\|y_2(k, t) - x_2(k, t-t_d)\|^2$. Accordingly, the controller 102 may set the first filter 202 and the second filter 204 based on the function $$\underset{H1_{adapt}(k),\ H2_{adapt}(k)}{\operatorname{argmin}} \|y_1(k, t) - x_1(k, t - t_d)\|^2 + \|y_2(k, t) - x_2(k, t - t_d)\|^2,$$

as explained above. The controller 102 may update the first filter 202 and the second filter 204 as new sounds are detected by the headset device 100. Accordingly, the first filter 202 and the second filter 204 may be adaptive filters.

The controller 102 may apply one or more constraint(s) 206 when setting the first filter 202 and the second filter 204. The one or more constraints may be based on one or more relationship(s) between sound properties of $x_1(k, t-t_d)$ and $x_2(k, t-t_d)$. To illustrate, the one or more constraints 206 may be based on a phase relationship (e.g., a phase difference) between $x_1(k, t-t_d)$ and $x_2(k, t-t_d)$, based on an amplitude relationship between $x_1(k, t-t_d)$ and $x_2(k, t-t_d)$, based on another relationship between $x_1(k, t-t_d)$ and $x_2(k, t-t_d)$, or a combination thereof.

In a particular example, the controller 102 may determine filter coefficients (e.g., corresponding to the filter data 106) of the first filter 202 and the second filter 204 based on:

$$\underset{H1_{adapt}(k),\, H2_{adapt}(k)}{\operatorname{argmin}} \|y_1(k, t) - x_1(k, t - t_d)\|^2 + \|y_2(k, t) - x_2(k, t - t_d)\|^2$$

with the constraint that a first ratio of amplitudes of the first feedback audio signal 115 and the second feedback audio signal 125 is equal to (or substantially equal to) a second ratio of amplitudes of the first reference audio signal 111 and the second reference audio signal 121. The constraint may be expressed as $$\frac{|y_1(k, t)|}{|y_{12}(k, t)|} = \frac{|x_1 k, t - t_d|}{|x_2(k, t - t_d)|}.$$

In another example, the controller 102 may solve $$\underset{H1_{adapt}(k),\, H2_{adapt}(k)}{\operatorname{argmin}} \|y_1(k, t) - x_1(k, t - t_d)\|^2 + \|y_2(k, t) - x_2(k, t - t_d)\|^2$$

with the constraint that a first phase difference between first feedback audio signal 115 and the second feedback audio signal 125 is equal to (or substantially equal to) a second phase difference between the first reference audio signal 111 and the second reference audio signal 121. The constraint may be expressed as $<y_1(k, t)-<y_1(k, t)=<x_1(k, t-t_d)=<x_2(k, t-t_d)$. As used herein, the symbol "$<$" denotes phase. In some examples, the controller 102 may apply more than one constraint. For example, the controller 102 may apply both constraints $$\frac{|y_1(k, t)|}{|y_{12}(k, t)|} = \frac{|x_1 k, t - t_d|}{|x_2(k, t - t_d)|} \text{ and } <$$

$$y_1(k, t) - <y_1(k, t) = <x_1(k, t - t_d) - <x_2(k, t - t_d).$$

In some examples, the filters 202, 204 may correspond to self-updating devices (e.g., adaptive filter devices with dedicated controllers). In such examples, the one or more constraints 206 may correspond to a value indicating the phase relationship between $x_1(k, t-t_d)$ and $x_2(k, t-t_d)$ (e.g., the phase difference), a value indicating the amplitude relationship between $x_1(k, t-t_d)$ and $x_2(k, t-t_d)$ (e.g., the amplitude ratio), or a combination thereof. In such examples, the controller 102 may send the one or more constraints 206 to the filters 202, 204. The first filter 202 may self-update based on the first error signal 203 and the one or more constraints 206. The second filter 204 may self-update based on the second error signal 213 and the one or more constraints 206.

Thus, a signal output at one of earpieces 108, 118 may be based on an indication of sound detected at the other earpiece. For example, the first signal 107 may be generated using the first filter 202 based on an indication of the second reference audio signal 121 (e.g., the one or more constraints 206 that is based on the second reference audio signal 121). The indication of the second reference audio signal 121 may include an indication of a phase value or of an amplitude value of the second reference audio signal 121. The first signal 107 may further be based on an indication of the second feedback audio signal 125 (e.g., the one or more constraints 206 that are based on the second feedback audio signal 125).

By applying the constraint(s) 206 to the filters 202, 204, the controller 102 may enable a sound passed through the headset device 100 by speakers 112, 122 and detected by the microphones 114, 124 to maintain sound properties of the sound as detected by the microphones 110, 120. Therefore, the headset device 100 may present the passed through sound to a user to enable the user to determine an origin point of a source of the sound.

Figure 3:
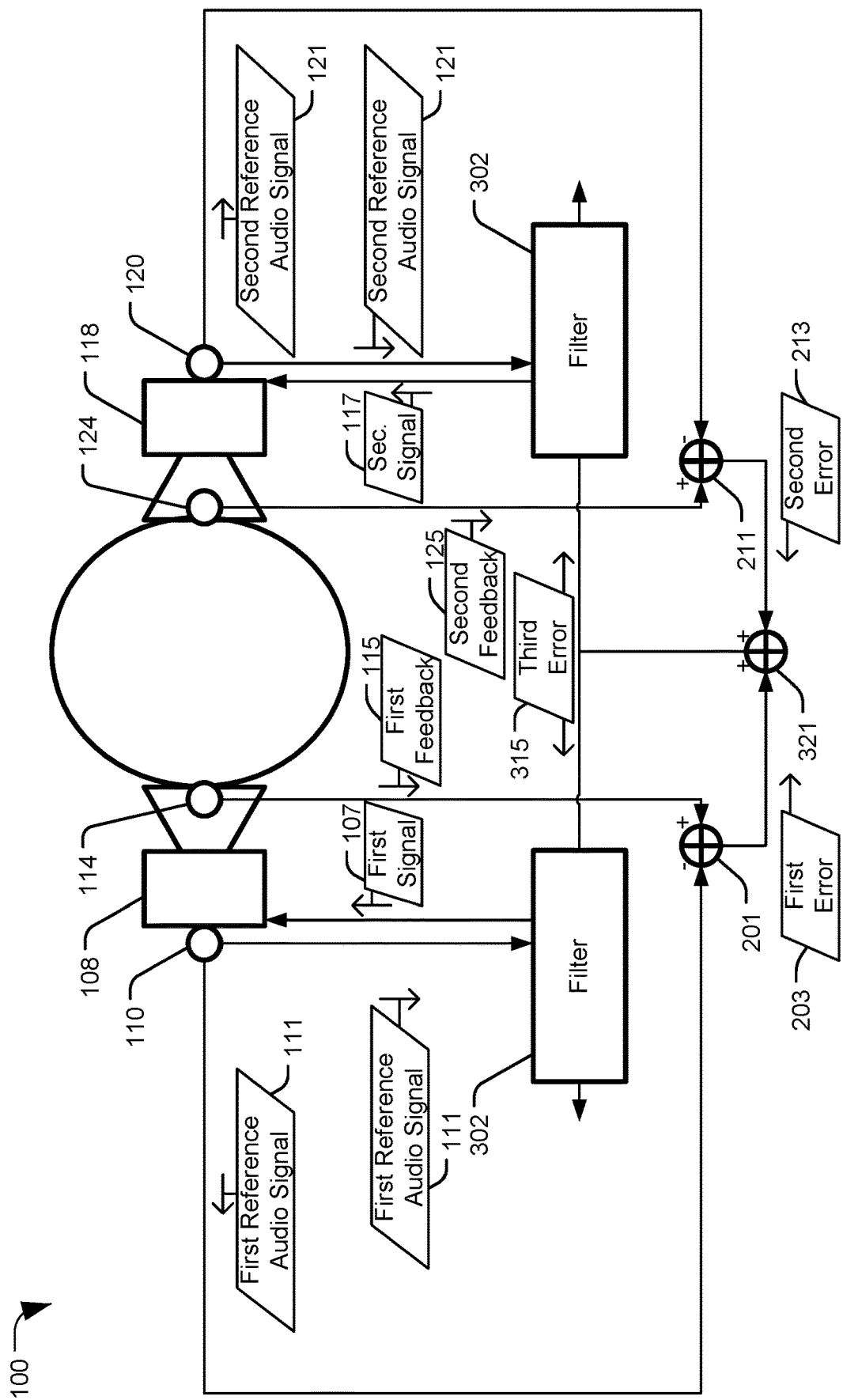
FIG. 3 is a diagram of another illustrative example of a headset device.

Referring to FIG. 3, another example of the headset device 100 is shown. As illustrated in FIG. 3, the headset device 100 includes the first earpiece 108, the second earpiece 118, the first microphone 110, the second microphone 120, the third microphone 114, the fourth microphone 124, the first mixer 201, and the second mixer 211. While not shown, the headset device 100 of FIG. 3 may include the first speaker 112, the second speaker 122, the controller 102, and the memory 104.

In the example of FIG. 3, the headset device 100 includes a filter 302. Thus, FIG. 3 illustrates an example of the filter data 106 corresponding to one filter. The filter 302 may include hardware or software. The filter 302 may be used to generate both the first signal 107 and the second signal 117. The headset device 100 of FIG. 3 further includes a third mixer 321.

The filter 302 may operate on one or more sub-bands of a sound spectrum (e.g., corresponding to the range of sound frequencies audible to humans). The first filter 202 and 204 may operate separately on multiple different sub-bands within the sound spectrum. The first feedback audio signal 115 may be described by the equation $y_1(k, t) = H_{adapt}(k)x_1(k, t-t_d) + H1_{occlusion}(k)x_1(k, t-t_d)$, where k corresponds to a sub-band of the sound spectrum, $t-t_d$ corresponds to a period of time, $x_1(k, t-t_d)$ is a function describing sound (e.g., the reference sound) in the sub-band detected by the first microphone 110 over the period of time, $H_{adapt}(k)$ is a function corresponding to the filter 302, and $H1_{occlusion}(k)$ is a function describing a distortion effect in the sub-band (e.g., to the reference sound) caused by the body of the first earpiece 108. The second feedback audio signal 125 may be described by the equation $y_2(k, t) = H_{adapt}(k)x_2(k, t-t_d) + H2_{occlusion}(k)x_2(k, t-t_2)$, where k corresponds to the sub-band of the sound spectrum, $t-t_d$ corresponds to the period of time, $x_2(k, t-t_d)$ is a function describing sound (e.g., the reference sound) in the sub-band detected by the second microphone over the period of time, $H2_{adapt}(k)$ is a function corresponding to the second filter 204, and $H2_{occlusion}(k)$ is a function describing a distortion effect (e.g., to the reference sound) in the sub-band caused by the body of the second earpiece 118. Thus, the first signal 107 may be described by the expression $H_{adapt}(k)x_1(k, t-t_d)$ and the second signal 117 may be described by the expression $H_{adapt}(k)x_2(k, t-t_d)$.

In order to reduce effects of $H1_{occlusion}(k)x_1(k, t-t_d)$ and $H2_{occlusion}(k)x_2(k, t-t_d)$, the controller 102 may configure the filter 302 according to the function $$\underset{H_{adapt}(k)}{\operatorname{argmin}} \|y_1(k, t) - x_1(k, t - t_d)\|^2 + \|y_2(k, t) - x_2(k, t - t_d)\|^2.$$

Thus, the controller 102 may configure the filter 302 (e.g., $H_{adapt}(k)$) to reduce a difference between sound detected by the third microphone 114 (e.g., $y_1(k, t)$) and sound detected by the first microphone 110 (e.g., $x_1(k, t-t_d)$) and a difference between sound detected by the fourth microphone 124 (e.g., $y_2(k, t)$) and sound detected by the second microphone 120 (e.g., $x_2(k, t-t_d)$). Accordingly, the headset device 100 may pass through a sound detected outside the headset device 100, and the filter 302 may reduce effects of distorted versions of the sound on a perception of a user.

In an illustrative example, the first mixer 201 may generate the first error signal 203 based on a difference between feedback from the third microphone 114 (e.g., the first feedback audio signal 115) and the first reference audio signal 111. The first error signal 203 may be represented by the expression $y_1(k, t)-x_1(k, t-t_d)$ or $\|y_1(k, t)-x_1(k, t-t_d)\|^2$. The second mixer 211 may generate the second error signal 213 based on a difference between feedback from the fourth microphone 124 (e.g., the second feedback audio signal 125) and the second reference audio signal 121. The second error signal 213 may be represented by the expression $y_2(k, t)-x_2(k, t-t_d)$ or $\|y_2(k, t)-x_2(k, t-t_d)\|^2$. The third mixer 321 may generate a third error signal 315 based on the first error signal 203 and the second error signal 213. The third error signal 315 may be represented by the expression $\|y_1(k, t)-x_1(k, t-t_d)\|^2+\|y_2(k, t)-x_2(k, t-t_d)\|^2$. The controller may set the filter 302 to reduce or minimize $\|y_1(k, t)-x_1(k, t-t_d)\|^2+\|y_2(k, t)-x_2(k, t-t_d)\|^2$. Accordingly, the controller set the filter 302 (e.g., set coefficients such as the filter data 106) based on the function $$\underset{H_{adapt}(k)}{\operatorname{argmin}} \|y_1(k, t) - x_1(k, t - t_d)\|^2 + \|y_2(k, t) - x_2(k, t - t_d)\|^2,$$

as explained above. The controller 102 may update the filter 302 as sounds are detected by the headset device 100. Accordingly, the filter 302 may be an adaptive filter.

Since the filter 302 (e.g., the filter data 106) is updated based on indications of sound detected at both earpieces 108, 118, sound generated at one earpiece may be based on sound detected at the other earpiece. For example, the first signal 107 may be generated using the filter 302 which is updated based in part on the second reference audio signal 121.

By using the same filter (e.g., the filter 302) the headset device 100 may maintain one or more relationships between $x_1(k, t-t_d)$ (e.g., the first reference audio signal 111) and $x_2(k, t-t_d)$ (e.g., the second reference audio signal 121) in $y_1(k, t)$ (e.g., the first feedback audio signal 115) and $y_2(k, t)$ (e.g., the second feedback audio signal 125) without applying a constraint. For example, a first amplitude relationship between the first feedback audio signal 115 and the second feedback audio signal 125

$$\left(\text{e.g., } \frac{|y_1(k, t)|}{|y_{12}(k, t)|}\right)$$

may substantially equal a second amplitude relationship between the first reference audio signal 111 and the second reference audio signal 121

$$\left(\text{e.g., } \frac{|x_1(k, t - t_d)|}{|x_2(k, t - t_d)|}\right).$$

In addition or in the alternative, a first phase relationship between the first feedback audio signal 115 and the second feedback audio signal 125 (e.g., $\angle y_1(k, t)-\angle y_1(k, t)$) may substantially equal a second phase relationship between the first reference audio signal 111 and the second reference audio signal 121 (e.g., $\angle x_1(k, t-t_d)-\angle x_2(k, t-t_d)$). That is, the headset device 100 may pass a sound through to a user's ears so that the passed through sound received at each ear maintains direction indicating properties.

Figure 4:
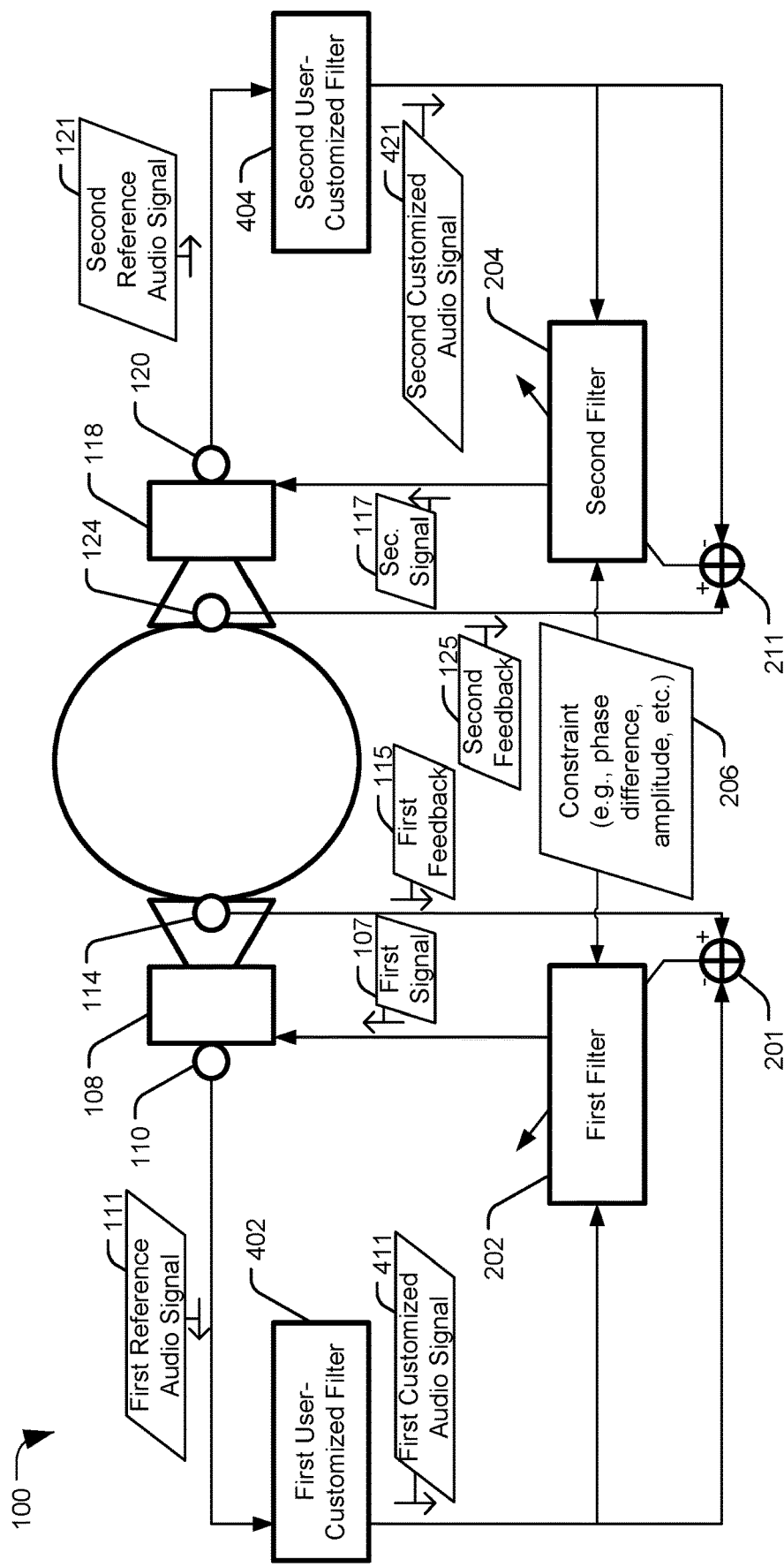
FIG. 4 is a diagram of another illustrative example of a headset device.

Referring to FIG. 4, another example of the headset device 100 is shown. As illustrated in FIG. 4, the headset device 100 includes the first earpiece 108 and the second earpiece 118, the first microphone 110, the second microphone 120, the third microphone 114, the fourth microphone 124, the first filter 202, the second filter 204, the first mixer 201, and the second mixer 211. While not shown, the headset device 100 of FIG. 4 may include the first speaker 112, the second speaker 122, the controller 102, and the memory 104.

In the example of FIG. 4, the headset device 100 further includes a first user-customized filter 402 and a second user-customized filter 404. Thus, FIG. 4 illustrates an example of the filter data 106 corresponding to four different filters. The first user-customized filter 402 may correspond to the first earpiece 108, and the second user-customized filter 404 may correspond to the second earpiece 118. It should be noted that while FIG. 4 illustrates user-customized filters added to the two filter implementation of FIG. 2, in other examples, one or more user-customized filters may be incorporated into other implementations, such as the single filter implementation illustrated in FIG. 3.

In FIG. 4, the first user-customized filter 402 is applied (e.g., by the controller 102) to the first reference audio signal 111 to generate the first customized audio signal 411. In a particular example, the first user-customized filter 402 corresponds to a first ear of a user. The first user-customized filter 402 may be configured to apply one or more gains to frequency sub-bands of signals input into the first user-customized filter 402. For example, the controller 102 may determine the first user-customized filter 402 based on user input indicating a user's perception of a plurality of frequency sub-bands of the sound spectrum via the first ear. The user input may be responsive to one or more test tones output to the first ear (e.g., by the first earpiece 108) over the plurality of frequency sub-bands. The user input may indicate user hearing perception over each of the frequency sub-bands. Accordingly, the first user-customized filter 402 may adjust sounds based on user hearing perception (e.g., due to hearing loss or other variations) of sounds via the first ear.

The second user-customized filter 404 may be applied (e.g., by the controller 102) to the second reference audio signal 121 to generate the second customized audio signal 421. The second user-customized filter 404 may correspond to a second ear of the user. The second user-customized filter 404 may be configured to apply one or more gains to frequency sub-bands of signals input into the second user-customized filter 404. For example, the controller 102 may determine the second user-customized filter 404 based on user input indicating the user's perception of a plurality of frequency sub-bands of the sound spectrum via the second ear. The user input may be responsive to one or more test tones output to the second ear (e.g., by the second earpiece 118) over the plurality of frequency sub-bands. The user input may indicate user hearing perception over each of the frequency sub-bands. Accordingly, the second user-customized filter 404 may adjust sounds based on a user hearing perception (e.g., due to hearing loss or other variations) of sounds via the first ear.

As compared to FIG. 2, the first customized audio signal 411 may replace the first reference audio signal 111 as input to the first filter 202. Similarly, the second customized audio signal 421 may replace the second reference audio signal 121 as input to the second filter 204. Accordingly, the amplitudes of a plurality of frequency sub-bands of the first signal 107 may be tailored to the user's first ear, and amplitudes of a plurality of frequency sub-bands of the second signal 117 may be tailored to the user's second ear.

In FIG. 4, the first feedback audio signal 115 may be described by the equation $y_1(k, t) = H1_{adapt}(k) H1_{user}(k) x_1(k, t-t_d) + H1_{occlusion}(k) x_1(k, t-t_d)$, where k corresponds to a sub-band of the sound spectrum, $t-t_d$ corresponds to a period of time, $x_1(k, t-t_d)$ is a function describing sound (e.g., the reference sound) in the sub-band detected by the first microphone 110 over the period of time, $H1_{user}(k)$ is a function corresponding to the first user-customized filter 402, $H1_{adapt}(k)$ is a function corresponding to the first filter 202, and $H1_{occlusion}(k)$ is a function describing a distortion effect in the sub-band (e.g., to the reference sound) caused by the body of the first earpiece 108. The second feedback audio signal 125 may correspond to sound as presented to a second ear of the user of the headset device 100. The second feedback audio signal 125 may be described by the equation $y_2(k, t) = H2_{adapt}(k) H2_{user}(k) x_2(k, t-t_d) + H2_{occlusion}(k) x_2(k, t-t_d)$, where k corresponds to the sub-band of the sound spectrum, $t-t_d$ corresponds to the period of time, $x_2(k, t-t_d)$ is a function describing sound (e.g., the reference sound) in the sub-band detected by the second microphone over the period of time, $H2_{user}(k)$ is a function corresponding to the second user-customized filter 404, $H2_{adapt}(k)$ is a function corresponding to the second filter 204, and $H2_{occlusion}(k)$ is a function describing a distortion effect (e.g., to the reference sound) in the sub-band caused by the body of the second earpiece 118. The first signal 107 may be described by the expression $H1_{adapt}(k) x_1(k, t-t_d)$, and the second signal 117 may be described by the expression $H2_{adapt}(k) x_2(k, t-t_d)$.

In order to reduce effects of $H1_{ocausion}(k) x_1(k,t-t_d)$ and $H2_{occlusion}(k) x_2(k,t-t_d)$ on sound presented to the first ear and the second ear, the controller 102 may configure the filters 202, 204 according to the function:

$$\operatorname*{argmin}_{H1_{adapt}(k),\ H2_{adapt}(k)} \|Term1\|^2 + \|Term2\|^2,$$

$$Term1 = y_1(k, t) - H1_{user}(k) x_1(k, t-t_d)$$

$$Term2 = y_2(k, t) - H2_{user}(k) x_2(k, t-t_d)$$

where $H1_{user}(k) x_1$ corresponds to the first customized audio signal 411 and $H2_{user}(k) x_2$ corresponds to the second customized audio signal 421. Thus, the controller 102 may configure the first filter 202 (e.g., $H1_{adapt}(k)$) and the second filter 204 (e.g., $H2_{adapt}(k)$) to reduce a difference between sound detected by the third microphone 114 (e.g., $y_1(k,t)$) and output of the first user-customized filter 402 (e.g., $H1_{user}(k) x_1(k,t-t_d)$) and a difference between sound detected by the fourth microphone 124 (e.g., $y_2(k,t)$) and output of the second user-customized filter 404 (e.g., $H2_{user}(k) x_2(k,t-t_d)$). Accordingly, the headset device 100 may pass through an adjusted version of a sound detected outside the headset device 100, and the filters 202, 204 may reduce effects of distorted versions of the sound on a perception of a user.

Further, the controller 102 may apply one or more of the constraint(s) 206 when setting the first filter 202 and the second filter 204. The one or more constraints may be based on one or more relationship(s) between sound properties of $H1_{user}(k) x_1(k,t-t_d)$ and $H2_{user}(k) x_2(k,t-t_d)$. To illustrate, the one or more constraints 206 may be based on a phase relationship (e.g., a phase difference) between $H1_{user}(k) x_1(k,t-t_d)$ and $H2_{user}(k) x_2(k,t-t_d)$, based on an amplitude relationship between $H1_{user}(k) x_1(k,t-t_d)$ and $H2_{user}(k) x_2(k,t-t_d)$, based on another relationship between $H1_{user}(k) x_1(k,t-t_d)$ and $H2_{user}(k) x_2(k, t-t_d)$, or a combination thereof.

In a particular example, the controller 102 may determine filter coefficients (e.g., corresponding to the filter data 106) of the first filter 202 and the second filter 204 based on:

$$\operatorname*{argmin}_{H1_{adapt}(k),\ H2_{adapt}(k)} \|Term1\|^2 + \|Term2\|^2,$$

$$Term1 = y_1(k, t) - H1_{user}(k) x_1(k, t-t_d)$$

$$Term2 = y_2(k, t) - H2_{user}(k) x_2(k, t-t_d)$$

with the constraint that a first ratio of amplitudes of the first feedback audio signal 115 and the second feedback audio signal 125 is equal to (or substantially equal to) a second ratio of amplitudes of the first customized audio signal 411 and the second customized audio signal 421. That is, the constraint may be expressed as $$\frac{|y_1(k, t)|}{|y_2(k, t)|} = \frac{|H1_{user}(k)||x_1(k, t-t_d)|}{|H2_{user}(k)||x_2(k, t-t_d)|}.$$

In another example, the controller 102 may solve $$\operatorname*{argmin}_{H1_{adapt}(k),\ H2_{adapt}(k)} \|Term1\|^2 + \|Term2\|^2,$$

$$Term1 = y_1(k, t) - H1_{user}(k) x_1(k, t-t_d)$$

$$Term2 = y_2(k, t) - H2_{user}(k) x_2(k, t-t_d)$$

with the constraint that a first phase difference between first feedback audio signal 115 and the second feedback audio signal 125 is equal to a second phase difference between the first customized audio signal 411 and the second customized audio signal 421. That is, the constraint may be expressed as $<y_1(k,t) - <y_1(k,t) = <H1_{user}(k) x_1(k,t-t_d) - <H2_{user}(k) x_2(k,t-t_d)$. In some examples, the controller 102 may apply more than one constraint. For example, the controller 102 may apply both constraints $$\frac{|y_1(k, t)|}{|y_2(k, t)|} = \frac{|H1_{user}(k)||x_1(k, t-t_d)|}{|H2_{user}(k)||x_2(k, t-t_d)|} \text{ and } < y_1(k, t) - <$$

$$y_1(k, t) = <H1_{user}(k) x_1(k, t-t_d) - <H2_{user}(k) x_2(k, t-t_d).$$

By applying the constraint(s) 206 to the filters 202, 204, the controller 102 may enable a user-customized sound passed through the headset device 100 by speakers 112, 122 and detected by the microphones 114, 124 to maintain sound properties of the sound as detected by the microphones 110, 120. Therefore, the headset device 100 may present the passed through sound to a user to enable the user to determine an origin point of a source of the sound.

In the use case of the user of the headset device 100 in the coffee shop, the user may have a hearing impairment in one or both ears that affects one or more sub-bands of the audio spectrum. The first user-customized filter 402 may apply one or more gains to sub-bands of the first reference audio signal 111 based on a profile associated with the user's left ear. In addition or in the alternative, the second user-customized filter 404 may apply one or more gains to sub-bands of the second reference audio signal. Accordingly, the user may be able to hear and to locate the barista despite the hearing impairment.

Figure 5:
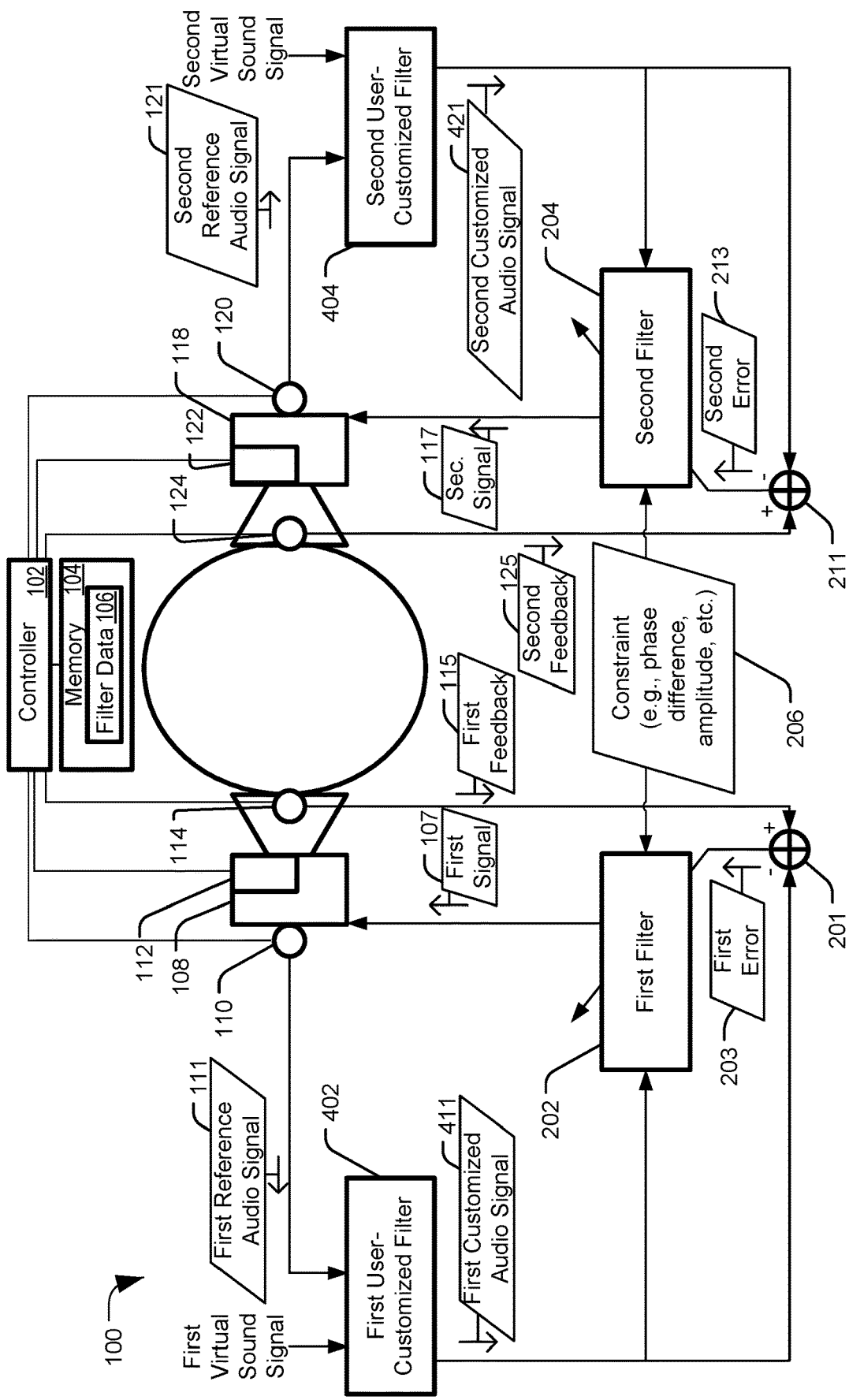
FIG. 5 is a diagram of another illustrative example of a headset device.

Referring to FIG. 5, another example of the headset device 100 is shown. As illustrated in FIG. 5, the headset device 100 includes the first earpiece 108, the second earpiece 118, the first microphone 110, the second microphone 120, the third microphone 114, the fourth microphone 124, the first filter 202, the second filter 204, the first user-customized filter 402, the second user-customized filter 404, the first mixer 201, and the second mixer 211. While not shown, the headset device 100 of FIG. 5 may include the first speaker 112, the second speaker 122, the controller 102, and the memory 104.

The implementation illustrated in FIG. 5 may operate as described with reference to FIG. 4 except the first user-customized filter 402 and the second user-customized filter 404 may further receive sound data from an additional sound source. For example, the first user-customized filter 402 may receive a first virtual sound signal and the second user-customized filter 404 may receive a second virtual sound signal. The first user-customized filter 402 may mix the first virtual sound with the first reference audio signal 111 and apply a plurality of gains to frequency sub-bands of the mixed signal to generate the first customized audio signal 411. The first virtual sound signal may correspond to a first component (e.g., left ear or right ear) of a virtual sound (e.g., a computer generated sound). The virtual sound may be generated by the controller 102 or received at the headset device 100 from another computing device. Thus, the first customized audio signal 411 may represent the reference sound and the virtual sound.

The second user-customized filter 404 may mix the second virtual sound with the second reference audio signal 121 and apply a plurality of gains to frequency sub-bands of the mixed signal to generate the second customized audio signal 421. The second virtual sound signal may correspond to a second component (e.g., left ear or right ear) of the virtual sound. Thus, the second customized audio signal 421 may represent the reference sound and the virtual sound.

Therefore, FIG. 5 illustrates that the headset device 100 may pass a detected sound through to a user and may include a virtual sound in the passed-through sound. The passed-through sound may be adjusted using one or more filters to compensate for the sound penetrating the body of the headset device 100. Further, the sound may be passed through to each ear of the user in a way that maintains direction indicating relationships between sound heard at the left ear and sound heard at the right ear. It should be noted that the examples of the headset device 100 illustrated in FIGS. 2 and 3 may also support virtual sounds being mixed with pass through sounds. For example, the first filter 202 may mix the first reference audio signal 111 with a virtual sound, the second filter 204 may mix the second reference audio signal 121 with a virtual sound, the filter 302 may mix the first reference audio signal 111 with a virtual sound, or the filter 302 may mix the second reference audio signal 121 with a virtual sound. Accordingly, any of the embodiments described herein may support mixing a virtual sound with a sound passed through to a user.

In the use case of the user of the headset device 100 in the coffee shop, the first virtual sound and the second virtual sound may correspond to left and right audio channels of a music output. The first signal 107 may include the barista's voice and the left audio channel of the music output. Similarly, the second audio signal 117 may include the barista's voice and the music output. Accordingly, the user may be able to hear and locate the barista while listening to music with the headset device 100.

Figure 6:
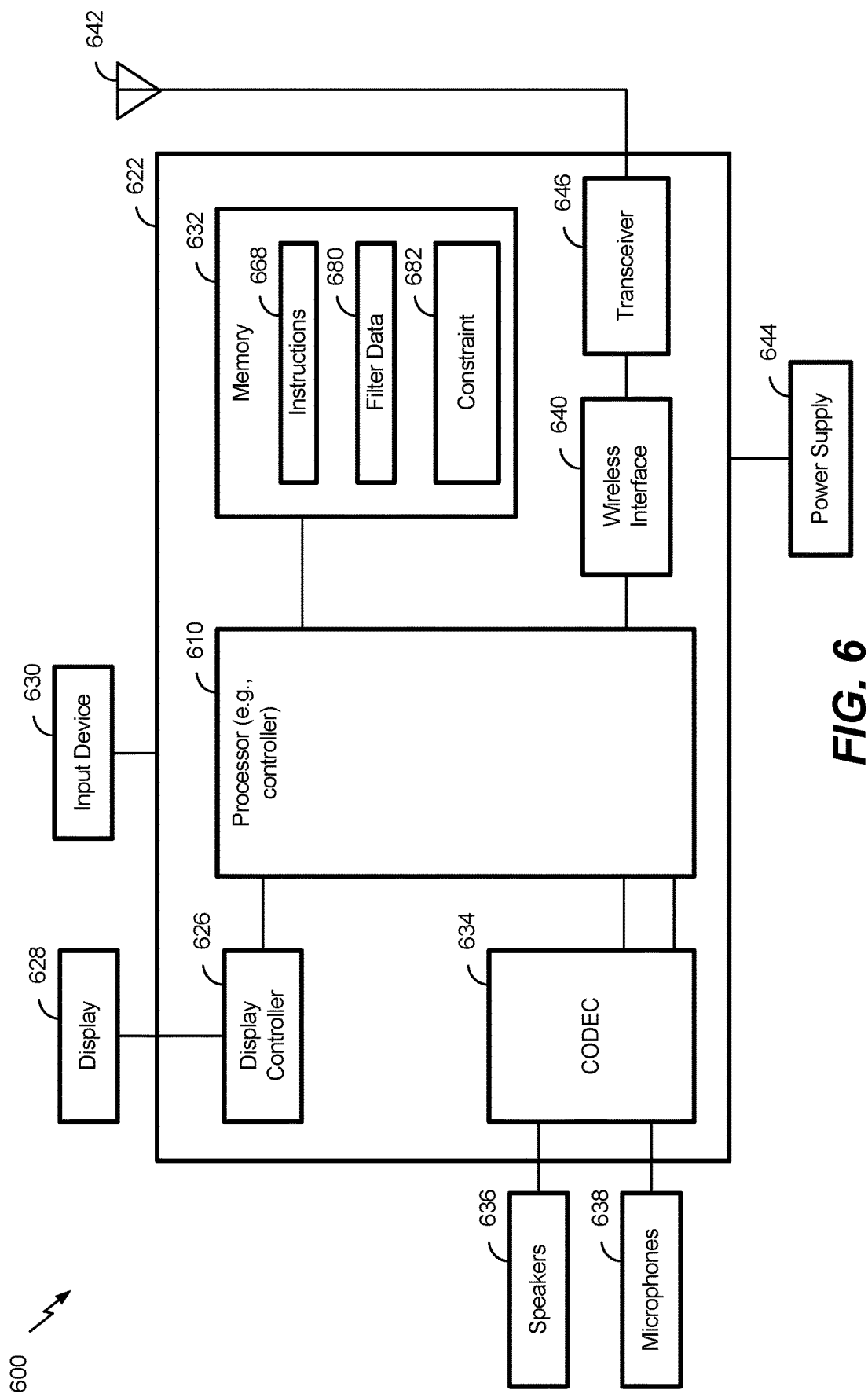
FIG. 6 is a block diagram of a device that may include a headset device.

Referring to FIG. 6, a block diagram of a particular illustrative implementation of a device (e.g., a wireless communication device) is depicted and generally designated 600. In various implementations, the device 600 may have more or fewer components than illustrated in FIG. 6.

In a particular implementation, the device 600 includes a processor 610, such as a central processing unit (CPU) or a digital signal processor (DSP), coupled to a memory 632. The processor 610 may include or correspond to the controller 102 illustrated in FIG. 1.

The memory 632 includes instructions 668 (e.g., executable instructions) such as computer-readable instructions or processor-readable instructions. The instructions 668 may include one or more instructions that are executable by a computer, such as the processor 610.

FIG. 6 also illustrates a display controller 626 that is coupled to the processor 610 and to a display 628. A coder/decoder (CODEC) 634 may also be coupled to the processor 610. Speakers 636 and microphones 638 may be coupled to the CODEC 634. The speakers 636 may correspond to the first speaker 112 and the second speaker 122. The microphones 638 may correspond to the first microphone 110, the second microphone 120, the third microphone 114, and the fourth microphone 124.

FIG. 6 also illustrates that a wireless interface 640, such as a wireless controller, and a transceiver 646 may be coupled to the processor 610 and to an antenna 642, such that wireless data received via the antenna 642, the transceiver 646, and the wireless interface 640 may be provided to the processor 610. In some implementations, the processor 610, the display controller 626, the memory 632, the CODEC 634, the wireless interface 640, and the transceiver 646 are included in a system-in-package or system-on-chip device 622. In some implementations, an input device 630 and a power supply 644 are coupled to the system-on-chip device 622. Moreover, in a particular implementation, as illustrated in FIG. 6, the display 628, the input device 630, the speakers 636, the microphones 638, the antenna 642, and the power supply 644 are external to the system-on-chip device 622. In a particular implementation, each of the display 628, the input device 630, the speakers 636, the microphones 638, the antenna 642, and the power supply 644 may be coupled to a component of the system-on-chip device 622, such as an interface or a controller.

The device 600 may include a headset, such as the headset device 100. The headset may correspond to a virtual or augmented reality headset configured to present artificial (e.g., computer generated) auditory or visual sensory input to a user. In alternative embodiments, the device 600 may include a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a component of a vehicle, or any combination thereof in communication with or integrated with a headset.

In an illustrative implementation, the memory 632 includes or stores the instructions 668 (e.g., executable instructions), such as computer-readable instructions or processor-readable instructions. For example, the memory 632 may include or correspond to a non-transitory computer readable medium storing the instructions 668. The instructions 668 may include one or more instructions that are executable by a computer, such as the processor 610. The instructions 668, when executed by the processor 610, may cause the processor 610 to perform any of the operations described above with reference to FIGS. 1-5. In particular, the instructions 668 may cause the processor 610 to operate as the controller 102 described above.

The memory 632 further includes filter data 680. The filter data 680 may correspond to the filter data 106, the first filter 202, the second filter 204, the filter 302, the first user-customized filter 402, the second user-customized filter 404, or a combination thereof. The processor 610 may apply the filter data 680 to reference audio signals to generate new signals. In alternative embodiments, the filter data 680 may correspond to one or more hardware filters accessible to the processor 610 rather than to software stored in the memory 632.

The memory 632 further includes constraint data 682. The constraint data 682 may correspond to the one or more constraints 206 described above. The processor 610 may apply the constraint data 682 to the filter data 680 when generating filtered audio signals in order to maintain one or more direction indicating relationships, as explained above. In some examples, the memory 632 may not include the constraint data 682, but the processor 610 may maintain the one or more direction indicating relationships as described, for example, with reference to FIG. 3 above.

In conjunction with the described aspects, a headset device includes means for generating a first audio output. The means for generating the first audio output is configured to generate a first reference audio signal based on a reference sound. The means for generating the first audio output may correspond to the first earpiece 108, one or more components of the first earpiece 108, the controller 102, the filter data 106, the first filter 202, the filter 302, the first user-customized filter 402, the processor 610, the instructions 668, the filter data 680, the speakers 636, the CODEC 634, or a combination thereof.

The headset device further includes means for generating a second audio output. The means for generating the second audio output is configured to generate a second reference audio signal based on the reference sound. The means for generating the second audio output may correspond to the second earpiece 118, one or more components of the second earpiece 118, the controller 102, the filter data 106, the second filter 204, the filter 302, the second user-customized filter 404, the processor 610, the instructions 668, the filter data 680, the speakers 636, the CODEC 634, or to a combination thereof.

The headset device further includes means for generating a first signal and a second signal based on a phase relationship between the first reference audio signal and the second reference audio signal. The means for generating the first signal and the second signal is configured to output the first signal to the means for generating the first audio output and to output the second signal to the means for generating the second audio output. The means for generating the first signal and the second signal may correspond to the controller 102, the filter data 106, the first filter 202, the second filter 204, the first user-customized filter 402, the second user-customized filter 404, the processor 610, the instructions 668, the filter data 680, the codec 634, or a combination thereof.

The headset device may further include first means for detecting the reference sound. The first means for detecting is included in the means for generating the first output. The first means for detecting is configured to generate the reference audio signal based on the reference sound. The first means for detecting may correspond to the third microphone 114 or to the microphones 638.

The headset device may further include second means for detecting the reference sound. The second means for detecting is included in the means for generating the second output. The second means for detecting is configured to generate the reference audio signal based on the reference sound. The second means for detecting may correspond to the fourth microphone 124 or to the microphones 638.

One or more of the disclosed aspects may be implemented in a system or an apparatus, such as the device 600. The device 600 may correspond to the headset device 100 or to another device in communication with the headset device 100. For example, the processor 610 of the device 600 may correspond to the controller 102. While not illustrated in FIGS. 1-5, the headset device 100 may include a wired and/or a wireless interface to exchange signals with the device 600. Accordingly, the device 600 may control the headset device 100, as described above.

The device 600 may include a communications device, a fixed location data unit, a mobile location data unit, a mobile phone, a cellular phone, a satellite phone, a computer, a tablet, a portable computer, a display device, a media player, or a desktop computer. Alternatively or additionally, the device 600 may include a set top box, an entertainment unit, a navigation device, a personal digital assistant (PDA), a monitor, a computer monitor, a television, a radio, a satellite radio, a music player, a digital music player, a portable music player, a video player, a digital video player, a digital video disc (DVD) player, a portable digital video player, a vehicle, a component integrated within a vehicle, any other device that includes a processor or that stores or retrieves data or computer instructions, or a combination thereof. As another illustrative, non-limiting example, the system or the apparatus may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

In an illustrative example, the device 600 may receive the first reference audio signal 111, the second reference audio signal 121, or a combination thereof from the headset device 100. For example, the device 600 may receive the first reference audio signal 111, the second reference audio signal 121, or a combination thereof via a wired interface (not shown), the antenna 642, the transceiver 646, the wireless interface 640, or a combination thereof. The processor 600 may generate the first signal 107, the second signal 117, or a combination thereof, as described above with reference to FIGS. 1-5. Further, the device 600 may transmit the first signal 107, the second signal 117, or a combination thereof to the headset device 100 (e.g., via the wired interface, the antenna 642, the transceiver 646, the wireless interface 640, or a combination thereof). Thus, the device 600 operating in conjunction with the headset device 100 may perform the operations described above with reference to FIGS. 1-5. In alternate examples, the device 600 and the headset device 100 may exchange a different combination of signals in order to perform the operations described above with reference to FIGS. 1-5.

Although one or more of FIGS. 1-6 may illustrate systems, apparatuses, or methods according to the teachings of the disclosure, the disclosure is not limited to these illustrated systems, apparatuses, or methods. One or more functions or components of any of FIGS. 1-6 as illustrated or described herein may be combined with one or more other portions of another of FIGS. 1-6. Accordingly, no single implementation described herein should be construed as limiting and implementations of the disclosure may be suitably combined without departing form the teachings of the disclosure.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the disclosure herein may be implemented directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A device comprising:
   a memory configured to store a first signal and a second signal; and
   one or more processors, coupled to the memory, the one or more processors configured to:
   receive a first reference audio signal, of a first reference microphone, based on a reference sound;
   receive a first feedback audio signal, of a first feedback microphone, based on a first audio output of a first speaker;
   receive a second reference audio signal, of a second reference microphone, based on the reference sound;
   receive second feedback audio signal, of a second feedback microphone, based on a second audio output of a second speaker;
   generate a first error signal based on a difference between the first feedback audio signal and the first reference audio signal;
   generate a second error signal based on a difference between the second feedback audio signal and the second reference audio signal;
   generate a first value indicating a first phase difference between the first feedback audio signal and the second feedback audio signal;
   generate a second value indicating a second phase difference between the first reference audio signal and the second reference audio signal;
   generate a constraint so that the first value is substantially equal to the second value;
   apply the constraint to a first filter;
   filter the first reference audio signal by the first filter;
   provide the first signal to a first speaker based on application of the first constraint to the first filter and the first error signal, wherein the application of the constraint to the first filter enables the reference sound to pass through the first speaker;
   apply the constraint to a second filter;
   filter the second reference audio signal by the second filter; and
   provide the second signal to a second speaker based on application of the constraint to the second filter and the second error signal, wherein the application of the constraint to the second filter enables the reference sound to pass through the second speaker.

2. The device of claim 1, further comprising:
   the first reference microphone, coupled to the one or more processors, configured to receive the reference sound from a source external to the device, and generate the first reference audio signal based on the reference sound;
   the first feedback microphone, coupled to the one or more processors, configured to generate the first feedback audio signal based on the first audio output and the reference sound; and
   the first speaker, coupled to the one or more processors, configured to generate the first audio output based on the first signal.

3. The device of claim 2, further comprising a first earpiece, wherein the first earpiece is coupled to the first reference microphone, the first feedback microphone, the first speaker and the one or more processors.

4. The device of claim 3, wherein the earpiece is is integrated into a headset device.

5. The device of claim 1, further comprising:
   the second reference microphone, coupled to the one or more processors, configured to receive the reference sound from a source external to the device, and generate the second reference audio signal based on the reference sound;
   the second feedback microphone, coupled to the one or more processors, configured to generate the second feedback audio signal based on the second audio output and the reference sound; and the second speaker, coupled to the one or more processors, configured to generate the second audio output based on the second signal.

6. The device of claim 5, further comprising a second earpiece, wherein the second earpiece is coupled to the second reference microphone, the second feedback microphone, the second speaker and the one or more processors.

7. The device of claim 6, wherein the earpiece is integrated into a headset device.

8. The device of claim 5, further comprising a first earpiece, wherein the first earpiece comprises the first speaker; and wherein the application of the constraint to the filter enables the reference sound to pass through the first speaker to at least partially compensate for a first occlusion effect of the reference sound by the first earpiece.

9. The device of claim 5, wherein the device is a virtual reality headset or an augmented reality headset.

10. The device of claim 1, wherein the one or more processors are configured to generate the first signal and second signal based on a second constraint that is based on amplitude relationship between the first reference audio signal and the second reference audio signal.

11. The device of claim 10, wherein the amplitude relationship corresponds to a first comparison between a first amplitude of the first reference audio signal and a second amplitude of the second reference audio signal.

12. The device of claim 11, wherein the first comparison of the first amplitude of the first reference audio signal and the second amplitude of the second reference audio signal is substantially equal to a second comparison of a third amplitude of the first feedback audio signal and a fourth amplitude of the second feedback audio signal.

13. The device of claim 12, wherein the substantial equal comprises a match between the first comparison and the second comparison.

14. The device of claim 13, wherein the match comprises that the first comparison is equal to the second comparison.

15. The device of claim 1, wherein the first filter and the second filter are each an adaptive filter.

16. The device of claim 1, wherein the one or more processors include a first user-customized filter configured to receive the first reference audio signal, and generate a first customized audio signal, wherein the first customized audio signal is an input into the first filter in place of the first reference audio signal.

17. The device of claim 16, wherein the one or more processors are configured to mix a first virtual sound with the first reference audio signal to generate the first customized audio signal.

18. The device of claim 1, wherein the one or more processors include a second user-customized filter configured to receive the second reference audio signal, and generate a second customized audio signal, wherein the second customized audio signal is an input into the second filter in place of the second reference audio signal.

19. The device of claim 18, wherein the one or more processors are configured to mix a second virtual sound with the second reference audio signal to generate the second customized audio signal.

20. The device of claim 1, wherein the one or more processors are configured to mix a first virtual sound with the first reference audio signal to generate a first customized audio signal, and, mix a second virtual sound with the second reference audio signal to generate a second customized audio signal; wherein the first customized audio signal is an input into the first filter in place of the first reference audio signal and the second customized audio signal is an input into the second filter in place of the second reference audio signal.

21. The device of claim 20, wherein the first virtual sound and the second virtual sound are a same virtual sound.

22. The device of claim 1 wherein the reference sound is a voice of a person that is not wearing the device.

23. The device of claim 1, wherein the one or more processors are configured to determine a location of a sound source of the reference sound.

24. The device of claim 1, wherein the first filter and the second filter are part of one filter integrated into one processor.

25. The device of claim 1, wherein the first value is substantially equal to the second value comprises a match between the first value and the second value.

26. The device of claim 25, wherein the match between the first value and the second value comprises the first value being equal to the second value.

27. A method comprising:
reading from memory a first signal, and a second signal;
generating, with one or more processors, a first error signal based on a difference between a first feedback audio signal and a first reference audio signal;
generating, with the one or more processors, a second error signal based on a difference between a second feedback audio signal and a second reference audio signal;
generating a first value indicating a first phase difference between the first feedback audio signal and the second feedback audio signal;
generating a second value indicating a second phase difference between the first reference audio signal and the second reference audio signal;
generating a constraint so that the first value is substantially equal to the second value;
applying the constraint to a first filter;
filtering the first reference audio signal by the first filter;
providing the first signal to a first speaker based on application of the constraint to the first filter and the first error signal, wherein application of the constraint to the first filter enables the reference sound to pass through the first speaker;
applying the constraint to the second filter;
filtering the second reference audio signal by the second filter; and
providing the second signal to a second speaker based on the constraint to the filter and the second error signal, wherein application of the constraint to the second filter enables the reference sound to pass through the second speaker.

28. The method of claim 27, wherein the application of the constraint to the first filter enables the reference sound to pass through the first speaker to at least partially compensate for a first occlusion effect of the reference sound by a first earpiece, coupled to the first speaker.

29. The method of claim 27, further comprising generating the first signal and second signal based on a second constraint that is based on amplitude relationship between the first reference audio signal and the second reference audio signal.

30. The method of claim 27, further comprising mixing a first virtual sound with the first reference audio signal to generate a first customized audio signal, and mix a second virtual sound with the second reference audio signal to generate a second customized audio signal; wherein the first customized audio signal is an input into the first filter in place of the first reference audio signal and the second customized audio signal is an input into the second filter in place of the second reference audio signal.

* * * * *